United States Patent [19]
Sanders

[11] Patent Number: 5,563,705
[45] Date of Patent: Oct. 8, 1996

[54] OPTICAL POWER BALANCING IN INTERFEROMETRIC FIBER OPTIC GYROSCOPES

[75] Inventor: Glen A. Sanders, Scottsdale, Ariz.

[73] Assignee: Honeywell, Inc., Minneapolis, Minn.

[21] Appl. No.: 476,921

[22] Filed: Jun. 7, 1995

[51] Int. Cl.⁶ ..................................................... G01C 19/64
[52] U.S. Cl. ........................................................... 356/350
[58] Field of Search ............................................. 356/350

[56] References Cited

U.S. PATENT DOCUMENTS

| | | | |
|---|---|---|---|
| 4,673,293 | 6/1987 | Sanders | 356/350 |
| 4,773,759 | 9/1988 | Bergh et al. | 356/350 |
| 5,018,859 | 5/1991 | Chang et al. | 356/350 |
| 5,098,188 | 3/1992 | Melvern | 356/350 |
| 5,111,326 | 5/1992 | Ball | 359/244 |
| 5,351,252 | 9/1994 | Toyama et al. | 356/350 X |

OTHER PUBLICATIONS

G. Sanders, "Critical review of resonator fiber optic gyroscope technology," *Fiber Optic Sensors* vol. CR44 SPIE Optical Engineering Press Proceedings of the Conference of SPIE, Boston, Mass. (Sep. 8–11, 1992), pp. 133–159.

Primary Examiner—Vincent P. McGraw
Attorney, Agent, or Firm—John G. Shudy, Jr.

[57] ABSTRACT

An interferometric fiber optic gyroscope having a wavelength-sensitive splitter which has a splitting ratio that changes according to light wavelength. A feedback circuit indicates any difference that there might be in the intensities of counterpropagating beams in the sensing loop of the gyroscope, and provides a signal to the light source to change the light wavelength in a direction to cause the splitter ratio to change so as to equalize the beams' intensities for eliminating the Kerr effect.

9 Claims, 3 Drawing Sheets

OPTICAL POWER BALANCING IN INTERFEROMETRIC FIBER OPTIC GYROSCOPES

BACKGROUND OF THE INVENTION

The present invention concerns fiber optic systems having Kerr effect reduction schemes and, more particularly, arrangements for accommodating Kerr effect reduction by equalization of the power levels of electromagnetic waves counterpropagating in an optical fiber sensing loop.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. In order to achieve sensitive detection of rotation, the Sagnac interferometer is typically biased by a sinusoidal modulation of the differential phase between the counter-propagating beams within the interferometric loop. As a result, one of these opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e., the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sine on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector without optical phase modulation.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves which propagate in opposite directions through coil 10 are provided from an electromagnetic wave source, or light source 11, in FIG. 1. This source is typically a semiconductor light source such as a laser diode which provides electromagnetic waves, typically in the near-infrared part of the spectrum, with typical wavelengths of 830 nanometers (nm) to 1550 nm. Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 that emits light with suitable statistical properties.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of optical fiber is positioned against laser diode 11 at a point of optimum light emission therefrom, a point from which it extends to a first optical directional coupler 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode 13 which is electrically connected to a photodetection system 14.

Photodiode 13 detects electromagnetic waves, or light waves, impinging thereon from the portion of the optical fiber positioned thereagainst and provides a photo current in response to a signal component selection means 35. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, light can propagate in two polarization modes through the fiber. Thus, polarizer 15 is provided for the purpose of passing light propagating of one polarization, such that clockwise (cw) and counterclockwise (ccw) waves of the same polarization are introduced into the sensing loop and only light from the sensing loop of the same polarization for the cw and ccw waves are interfered at the detector. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bidirectional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 19 by a bias modulation signal generator 20 providing a sinusoidal voltage output signal at a modulation frequency $f_g$ that is intended to be equal to $C_1 \sin(\omega_g t)$ where $\omega g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent $i_{PD13}$ proportional to the intensity of the two electromagnetic waves or light waves impinging thereon, and is therefore expected to follow the cosine of the phase difference between these two waves impinging on that diode as given by the following equation:

$$i_{PD_{13}} = I_0/2[1 + \cos{(\phi_R + \phi_m \cos{\omega_g t})}]$$

This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_m$ and which is intended to vary as $\cos{(\omega_g t)}$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is converted to a voltage and provided through an amplifier 21, where it is amplified and passed through a filter 22, to such a phase sensitive detector means 23. Photodetection system 14, amplifier 21, filter 22 and phase sensitive detector 23 constitute signal component selection means. Phase-sensitive detector 23, serving as part of a phase demodulation system, is a well known device. Such a phase-sensitive detector extracts the amplitude of the first harmonic of the filtered photodiode system output signal, or the fundamental frequency of modulation signal generator 20, to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13.

Bias modulator signal generator 20, in modulating the light in the optical path at the frequency $f_g$ described above, also leads to harmonic components being generated by the recombined electromagnetic waves in photodetection system 14. Filter 22 is a bandpass filter which is to pass the modulation frequency component of the output signal of photodetector 14, i.e., the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves.

The amplitude scaling factor of the modulation frequency component of the output signal of photodetection system 14, appearing at the output of filter 22, is expected to be set by the sine of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$V_{21\text{-}out} = k\{1 + \cos{[\phi_R + \phi_m \cos{(\omega_g t + \theta)}]}\}$$

The constant k represents the gains through the system to the output of amplifier 21. The symbol $\theta$ represents additional phase delay in the output signal of amplifier 21 with respect to the phase of the signal provided by generator 20. Some of this phase shift will be introduced in photodetection system 14, and some will be due from other sources such as a phase shift across modulator 19 between the phase of the signals supplied by generator 20 and the response of modulator 19 in having the index of refraction of the media therein, and/or its length, correspondingly change. The other symbols used in the preceding equation have the same meaning as they did in the first equation above.

The foregoing equation can be expanded in a Bessel series expansion to give the following:

$$\begin{aligned}V_{21\text{-}out} = &\ k[1 + J_0(\phi_m)\cos\phi_R] - \\ & 2kJ_1(\phi_m)\sin\phi_R\cos(\omega_g t + \theta) - \\ & 2kJ_2(\phi_m)\cos\phi_R\cos 2(\omega_g t + \theta) + \\ & 2kJ_3(\phi_m)\sin\phi_R\cos 3(\omega_g t + \theta) + \\ & \sum_{n-2}^{\infty} [(-1)^n 2kJ_{2n}(\phi_m)\cos\phi_R\cos 2n(\omega t + \theta) + \\ & (-1)^n 2kJ_{2n+1}(\phi_m)\sin\phi_R\cos(2n+1)(\omega_g t + \theta)]\end{aligned}$$

This signal at the output of amplifier 21 is applied to the input of filter 22.

Filter 22, as indicated above, passes primarily the first harmonic from the last equation, i.e., the modulation frequency component. As a result, the output signal of filter 22 can be written as follows:

$$V_{22\text{-}out} = -2kJ_1(\phi_m)\sin\phi_R \cos{(\omega_g t + \theta + \psi_1)}$$

The further phase delay term appearing $\psi_1$ is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again intended to be equal to $C_1 \sin{(\omega_g t)}$ where $\omega g$ is the radian frequency equivalent of the modulation frequency $f_g$. Assuming that a phase shift equal to $\theta + \psi_1$ can be added by phase-sensitive detector 23 to its reference signal, the output of that detector with such a generator 20 output signal will then be the following:

$$_{23\text{-}out} = k'J_1(\phi_m)\sin\phi_R$$

The constant k' accounts for the system gains through phase-sensitive detector 23.

As can be seen from this equation, the output of phase sensitive detector 23 depends on the amplitude $\phi_m$ supplied by bias modulator 19 as operated by bias modulation generator 20 can be used to set the value of the signal at the output of phase-sensitive detector 23 for a given rotation rate of coil 10 about its axis, i.e., set the scale factor for the gyroscope at least within a range of possible values therefor.

However, these expected results may not be achieved in the system of FIG. 1. One reason for failing to achieve the expected results is that bias modulation signal generator 20, in modulating the light in the optical path at frequency $f_g$ as described above through phase modulator 19, not only results in harmonic components being generated in photodetection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_g$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

The "proper" frequency is selected to be that frequency which results in the modulating of one of the waves 180 degrees out of phase with the modulation of the other. This modulation providing 180 degrees of phase difference between the two waves has the effect of eliminating modulator induced amplitude modulation of the resulting photodetector signal. The value of the "proper" frequency can be determined from the length of the optical fiber and the equivalent refractive index therefor.

The resulting signal output of the phase sensitive demodulator follows a sine function, i.e. the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and can provide the maximum rate of change of signal value as a function of rotation rate near a zero rotation rate, i.e. has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator are a substantial improvement over the characteristics of the output current of the photodetector.

Nevertheless, the phase sensitive demodulator output, in following a sine function, results in an output that at rotation rates further from zero, is less and less linear. For rotation rates of an amplitude sufficient to be past one of the peaks of the sine function, the output response value because of being periodic will be ambiguous with respect to just which rotation rate is occurring. Thus, there is a strong desire to operate the gyroscope so that the output signal of the phase sensitive demodulator stays within the linear region near the zero rotation rate value.

This can be accomplished by adding a further phase modulator, or frequency shifter, near the coil in an optical path portion used by the opposite direction traveling electromagnetic waves propagating through the coiled optical fiber to reach the photodetector. This phase modulator, or frequency shifter, is operated in a feedback loop from the photodetector system, and provides sufficient negative feedback such that the phase modulator introduced phase change is just enough to cancel the phase shift difference between the opposite traveling direction electromagnetic waves resulting from a rotation about the axis of the coiled optical fiber. As a result, there will be little phase shift difference occurring at the photodetector except for transient rotation rate changes, and so little phase shift sensed by the phase sensitive demodulator. Thus, the output signal of this phase sensitive demodulator will always be near to, or at, zero. The signal from a generator connected to the phase sensitive demodulator for operating this additional phase modulator, through providing a signal directing the modulator to provide a particular phase shift sufficient to cancel the phase shift due to rotation, will thus contain within it or a related signal the information as to the magnitude and direction of the rotation rate.

Several forms for the output signal from the generator connected to the phase sensitive demodulator in the feedback loop have been suggested for operating this additional optical phase modulator. One common and good choice is to use a serrodyne generator which applies a sawtooth-like signal to the optical phase modulator. A sawtooth or sawtooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave the modulator with its frequency translated by an amount equal to the frequency of the sawtooth signal. A non-ideal sawtooth signal won't result in pure frequency translation, there instead will be added harmonics generated which can be kept small by providing very nearly a sawtooth waveform and by good design of the modulator.

Since the optical phase modulator so operated will be on one side of the coiled optical fiber, one of the electromagnetic waves will have its frequency translated upon entering the coil while the other will not have its frequency translated until it exits the coil. Hence, one wave traverses the loop having a higher frequency than the other (though both have the same frequency on reaching the photodetector) with the result that, for a fixed modulator (or serrodyne generator) frequency, one will have a phase shift with respect to the other at the photodetector in an amount set by the frequency of the sawtooth and the nature of the fiber of $2\pi\tau\Delta f$. Here, $\Delta f$ is the modulator or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

This is shown in FIG. 2. Rather than to the rotation rate indicator of FIG. 1, the signal from phase sensitive detector 23 goes to servo electronics 24 which is incorporated in FIG. 2. This signal indicates the magnitude and sign of the phase difference between beams. In response to such phase difference, servo electronics 24 outputs a phase ramp signal 25 that goes to summing amplifier 27 that supplies the phase ramp to modulator 19 in the form of signal 28 to phase-shift one beam relative to the other beam so as to bring the beams in phase with each other. Summing amplifier 27 also supplies in signal 28 the bias modulation signal to this phase modulator. The feedback signal required to return beams into phase, such as the frequency of the sawtooth in the serrodyne modulation case, is an indication of the rate of rotation of sensing loop 10. In this closed loop case, the modulator of choice is typically a phase modulator on an integrated optic chip (IOC) in order to accommodate the necessary high frequency content of the desired phase ramp signal which may be a sawtooth or a dual-ramp-type triangular wave. Signal 25, indicative of rotation, is then supplied to a rotation rate indicator 26 which provides a convenient and readily useful indication of rotation rate of loop 10.

SUMMARY OF THE INVENTION

The invention is a solution to the problem of unequal intensities of counterpropagating light beams in the sensing loop of a fiber optic gyroscope, that results in a Kerr effect which causes erroneous rotation rate indications. Equal intensities of these counterpropagating beams virtually eliminates the root cause of the Kerr effect in the gyroscope. The invention incorporates a wavelength-sensitive splitter, which has a splitting ratio that varies with wavelength, and a feedback circuit which provides a signal to the light source for changing the light wavelength so as to equalize the intensities of the counterpropagating beams in the sensing loop of the gyroscope.

DESCRIPTION OF THE EMBODIMENT

Figure 1:
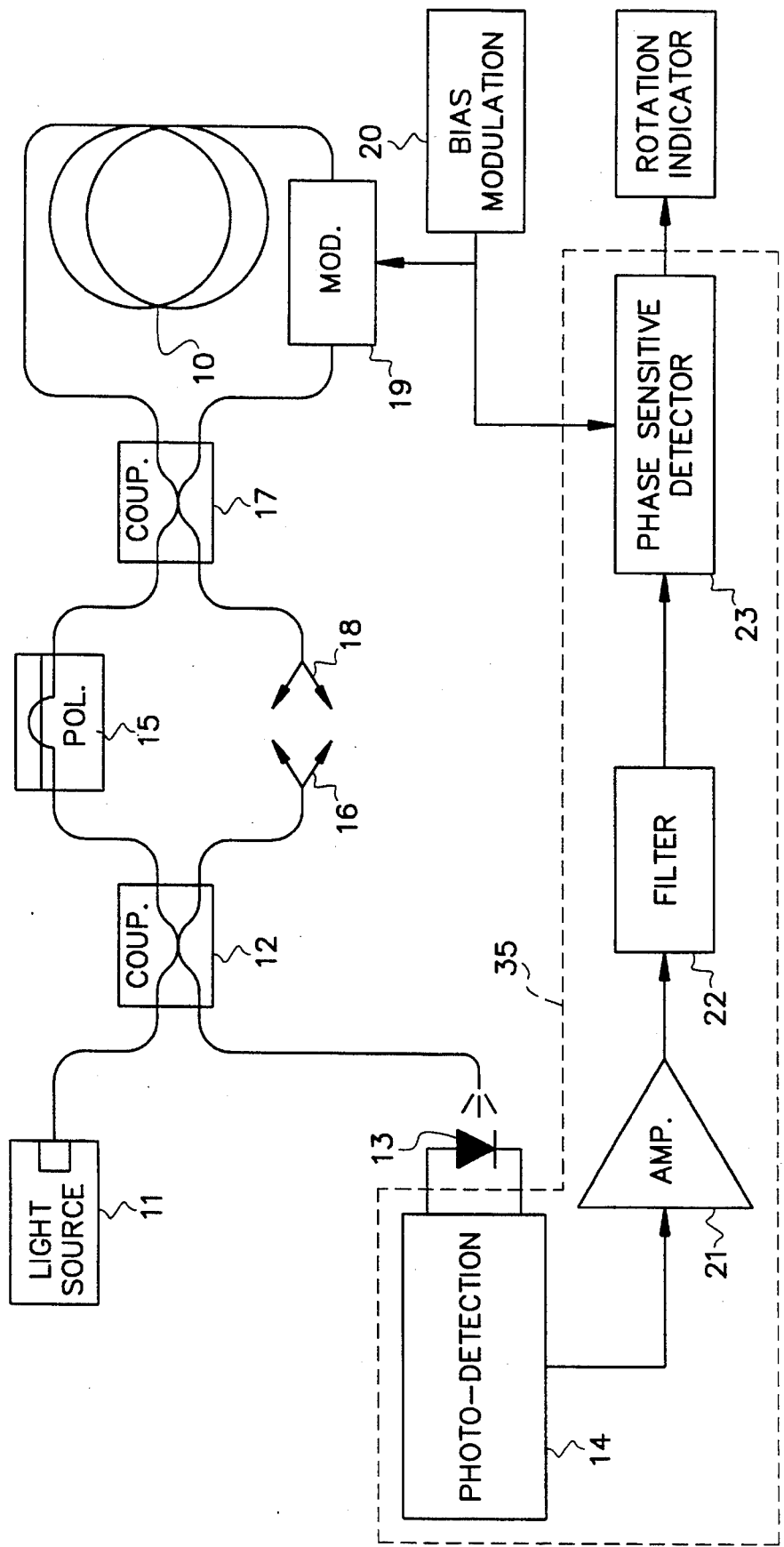
FIG. 1 shows an open loop interferometric fiber optic gyroscope of the related art.
Figure 2:
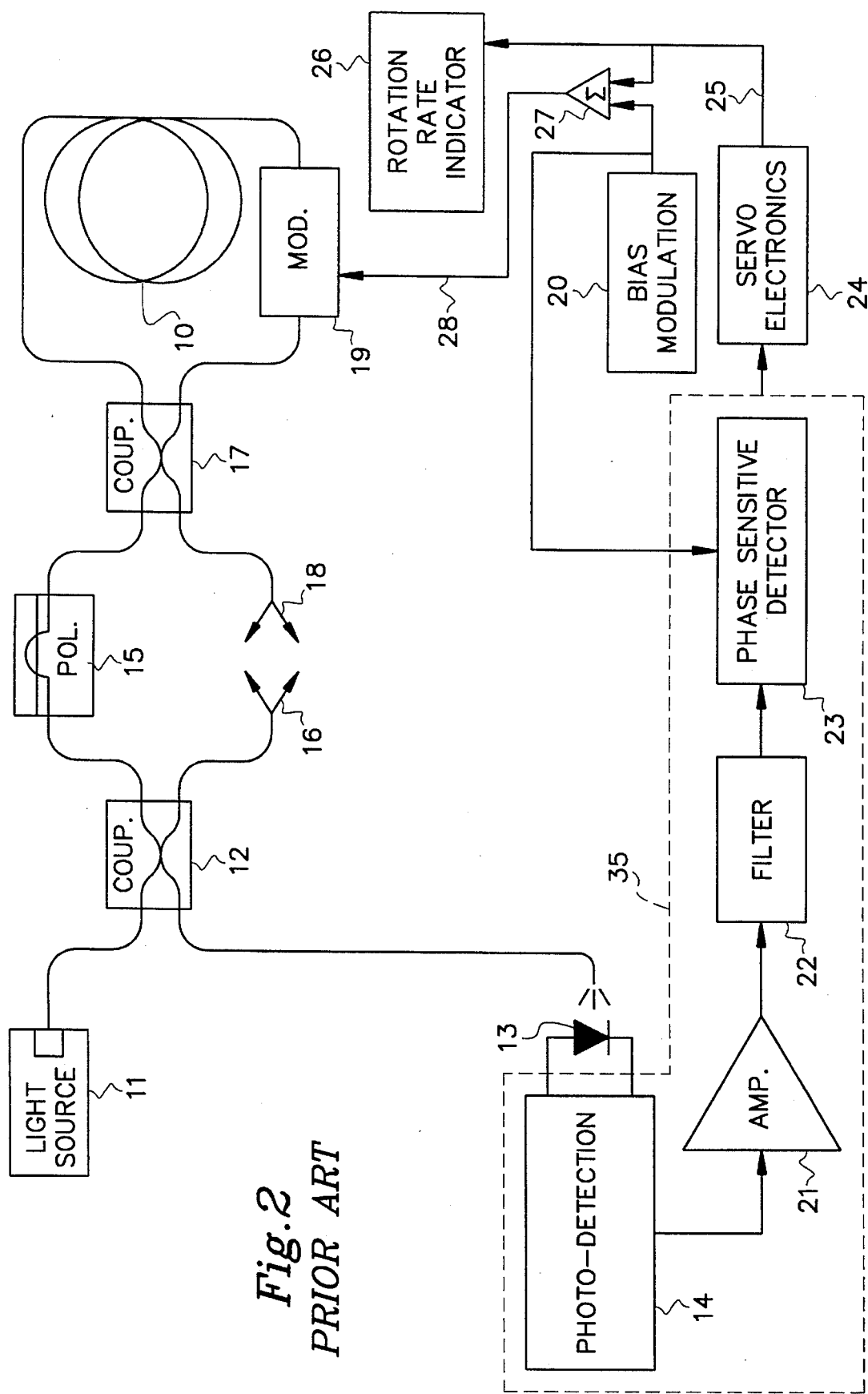
FIG. 2 shows a closed loop interferometer fiber optic gyroscope of the related art.
Figure 3:
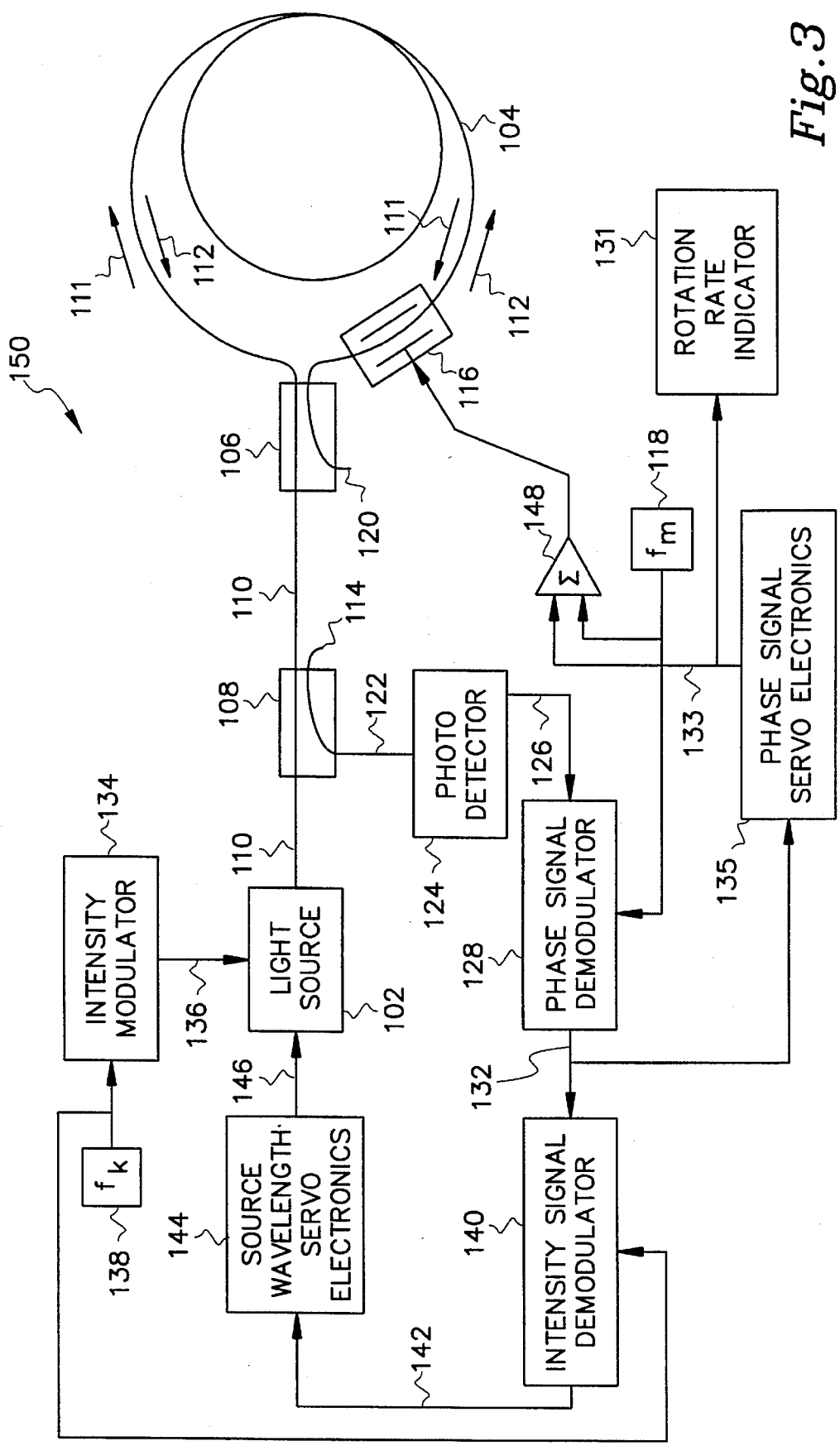
FIG. 3 reveals an embodiment of the invention in a fiber optic gyroscope.

Configuration 150 of a fiber optic gyroscope in FIG. 3 has a wavelength sensitive splitter 106 and a feedback circuit for balancing the intensities of counterpropagating beams 111 and 112 in sensing loop 104. Broadband light source 102 emits a light beam 110 that goes through splitter 108, of which a portion of the light is lost in splitter 108 at a nonreflective termination 114. The remaining portion of beam 110 goes into splitter 106 which splits beam 110 into beams 111 and 112. Beam 111 propagates through loop 104 in a clockwise direction and beam 112 propagates through loop 104 in a counterclockwise direction. Beam 112 is bias phase modulated as it enters loop 104 and beam 111 is bias phase modulated as it leaves loop 104. The bias phase modulation of beams 111 and 112 is effected by phase modulator 116 with a frequency $f_m$ from oscillator or modulator driver 118. Returning beams 111 and 112 enter splitter 106 and are combined. One portion of the combined light is lost in splitter 106 at a nonreflective termination 120. The remainder of the combination of beams 111 and 112 enter splitter 108 and a portion of the remainder of the combination of beams 111 and 112 enter fiber 122 which conveys such portion of beams 111 and 112 into photodetector 124. Photodetector converts the light of beams into a representative electrical signal 126 which goes to demodulator 128.

Beams 111 and 112 enter loop 104 in phase and counterpropagate the loop and exit the loop in phase provided that their optical paths have equal lengths in the loop. If there is a rotation of the loop about its axis which may be represented by a line that intersects the center of the loop and is perpendicular to a plane which encompasses the loop, the the optical paths of beams 111 and 112 are different due to the Sagnac effect. Another way that the optical paths of beams 111 and 112 may have different lenghts, even with loop 104 at rest, is due to differing indices of refraction between the optical paths. The beams travel at different speeds through a media having differing indices of refraction. Even though the same fiber is the path for both beams, the index of refraction for each beam is partially dependent on the relative power of both respective beams. If beams 111 and 112 have two different intensity levels, then the medium will in general have a different propagation constant for one wave than for the other wave. The change in the propagation constants due to the Kerr Effect in the cw and ccw directions, $\beta_{K1}$ and $\beta_{K2}$, respectively, are unequal due to unequal cw and ccw intensities $I_1(z,t)$ and $I_2(z,t)$ respectively, according to the following equations, $$\beta_{k1}(z,t) = \frac{4\pi\eta n_2}{\lambda} \delta[I_1(z,t) + 2I_2(z,t)] \qquad (1)$$

$$\beta_{k2}(z,t) = \frac{4\pi\eta n_2}{\lambda} \delta[I_2(z,t) + 2I_1(z,t)] \qquad (2)$$

where the above formulas reflect the fact that the intensities and therefore the propagation constants may vary with position around the fiber loop and in the case of source light with amplitude modulation, may vary in time. The variable z represents the position along the length of the loop, with z=0 defined by where the cw wave enters the loop at the output of coupler 106 and z=L being similarly defined where the ccw wave enters the loop of length L.

In the above equation, the wavelength of light is given by $\lambda$, the impedance of the coil medium by $\eta$, the Kerr coefficient of the coil fiber by $n_2$, and $\delta$ represents a constant factor related to the distribution of light across the fiber cross-section. As can be seen from the above formulas, if $I_1$ and $I_2$ are not equal at a given point in the loop at a given time, $\beta_{K1}$ and $\beta_{K2}$ will be different at that point in the fiber at that instant. In general, the source light may have amplitude modulation imposed upon it that will cause $I_1(t,z)$ and $I_2(t,z)$ to vary in time. Also, $I_1(t,z=0) \neq I_2(t,z=L)$, then the light waves entering the loop have unequal amplitudes, which causes differences between $\beta_{K1}$ and $\beta_{K2}$.

It should be noted that, in equation 1, that $\beta_{K1}$ is dependent on its own intensity $I_1(t,z)$ and twice as dependent on the intensity $I_2(t,z)$ of the oppositely propagating wave. That is, the dependence of $\beta_{K1}$ on the oppositely propagating wave, i.e., the cross effect, is twice as strong as the dependence on its own intensity, i.e., the self effect. This is similarly true for $\beta_{K2}$. If, instead, the two dependences were equal, then $\beta_{K1}$ would be equal to $\beta_{K2}$. Because of this relationship, an imbalance in $I_1$ and $I_2$ will in general give rise to unequal optical phase shifts around the loop. Thus, each beam will travel an optical path that has a different length than the other. In such case, beams 111 and 112 leave loop 104 out of phase with respect to each other despite the nonrotation of loop 104. If beams 111 and 112 are in phase, there is a constructive interference which results in a maximum type of light signal being presented to detector 124 which has corresponding electrical signal 126 indicating beams 111 and 112 to be in phase and, consequently, indicating the nonrotation of loop 104. However, when beams 111 and 112 have differing intensities and are out of phase, electrical signal 126 from detector 124 falsely indicates rotation of loop 104 when loop 104 is actually at rest. This false indication is an error due to an optical Kerr effect which is caused by the index of an optical medium not being completely independent of the intensity of a traversing beam in the medium. This false indication of rotation $\Omega_e$ is given by the following, $$\Omega_e = -\frac{2c}{D} \eta n_2 \delta (1-2U) \left[ \frac{<I_o^2(t)> - 2<I_o(t)>^2}{<I_o(t)>} \right] \quad (3)$$

where D is the sensing coil diameter, $I_o(t)$ is the source intensity at the time t of being split into $I_1$ and $I_2$ and entering the sensing coil, c is the speed of light in a vacuum and U is the split ratio of the loop coupler, i.e., $I_2 = UI_o$ and $I_1 = (1-U)I_o$. The brackets <> indicate the time average of the enclosed quantity, which may in general be time dependent. For the case of a monochromatic source with constant intensity $<I_o^2(t)> = <I_o(t)>^2$ making the term in brackets [] equal to $-<I_o>$ and providing for an error if $U \neq 0.5$. In this case, the situation employs the use of square wave modulation of the source light wave intensity $I_o$ with a 50 percent on/off duty cycle to eliminate this effect. This makes $<I_o^2(t)> = 2<I_o(t)>^2$ and thus, the term in brackets [] in equation 3 equal to zero. This elimination of the Kerr effect for all values of U is accomplished. This is accomplished by essentially halving the size of the cross effect in equations 1 and 2 since the two optical waves only overlap half the time, whereas the self effect is always present. In this implementation, the modulation frequency $f_m$ must be above the inverse of the coil transit time $\tau$, and is typically a factor of ten above $1/\tau$ to achieve most of the benefit of this error reduction technique. In general, different light sources have different relationships between $<I_o^2(t)>$ and $<I_o(t)>^2$. Broadband sources such as superluminescent diodes were originally pursued for interferometric fiber optic gyroscope applications as a means of eliminating drift due to light backscatter in the sensing loop and due to the propagation of light in the unwanted second state of polarization in the sensing loop. In the case of broadband sources, the relationship of $<I_o^2(t)>$ to $2<I_o(t)>^2$ depends on how the source is energized and in general will be different than the case of a monochromatic source of constant amplitude. These differences are due to intensity fluctuations resulting from the instantaneous beating of independent oscillators that comprise a broad spectral source. Thus, depending on the specific broadband source and method of excitation, the Kerr effect will be different for a gyro using a broadband source. A solution is to assure that the Kerr effect is zero by making the intensity levels of beams 111 and 112 effectively equal to each other. For this purpose, it is possible to simplify equation (3) by representing $\Omega_e$ as $$\Omega_e = k_1(1-2U)<I_o(t)> = k_1(1-2U)I_o(t) \quad (4)$$

where $$k_1 = \frac{2c}{D} \eta n_2 \delta \left[ \frac{<I_o^2(t)> - 2<I_o(t)>^2}{<I_o(t)>^2} \right] \quad (5)$$

and where the <> in equation (4) was dropped and from here on $I_o(t)$ refers to only the average value of $I_o(t)$. However the average value of $I_o(t)$ is considered here to vary slowly, but in a timeframe much longer than $\tau$. Thus, the <> in equations 3 and 5 were intended average over times substantially longer than $\tau$. Output signal 126 from photodetector/preamp combination 124 is then given by $$V_{126} = k\{1 + \cos[\phi_R + \phi_e + \phi_m \cos(\omega_g t + \Theta)]\} \quad (6)$$

where $$\phi_e = \Omega_e \left( \frac{2\pi LD}{\lambda c} \right) \quad (7)$$

where L is sensing loop length and D is the diameter of the sensing loop, and k is a constant that includes the source intensity $I_o$, the photodetector gain, and the losses of the optical circuit.

Demodulator 128 receives signal 126 and demodulates that signal with respect to a reference signal from oscillator or phase modulator 118 at frequency $f_m$. An output signal 132 of demodulator 128

$$V_{132} = k' J_1(\phi_m) \sin(\phi_R + \phi_e) \quad (8)$$

goes to phase signal servo electronics 135, where k' is a constant that includes k and the demodulator gain.

In order to achieve the required output linearity at rotation rates further from zero, i.e., use the linear portion of the sine function in equation 8, the gyro is operated in a closed loop manner. Signal 132 is used to represent the servo error signal being indicative of a phase difference between waves 111 and 112. Upon acceptance of signal 132 phase signal servo electronics 133 generates a voltage ramp of sawtooth type in accordance with serrodyne modulation that is summed in the bias modulation in amplifier 148. The voltage ramp is then supplied to the integrated optical phase modulator that produces a sawtooth phase ramp in the sensing loop. This phase ramp produces another optical phase difference $\phi_f$ between waves 111 and 112 in order to restore $V_{132}$ to its null condition. The phase ramp signal 133 will contain within it the information related to the magnitude and direction of rotation rate. Signal 133 is therefore supplied to rotation rate indicator 131 to extract the rotation information and output the result. Under closed loop operation, the new form of signal 132 is given by $$V'_{132} = k' J_1(\phi_m) \sin(\phi_R + \phi_e + \phi_f)$$

where $\phi_R$, $\phi_e$, and $\phi_f$ are optical phase differences due to rotation, the Kerr effect, and the applied phase ramp, respectively.

The present invention provides a device for eliminating erroneous rotation indications caused by the optical Kerr effect. Light 110 is intensity modulated by modulator 134 providing a modulation signal 136 to light source 102. Modulation signal 136 is at a frequency $f_k$ which is provided by oscillator or modulator driver 138. Thus, the intensity of lightwave 110 may be represented as $$I_0(t) = I_{00} + I_{01} \cos \omega_k t (\omega_k << 1/\tau) \quad (9)$$

where $\omega_k = 2\pi f_k$, $I_{00}$ is the constant part of the average intensity and $I_{01}$ is the modulation amplitude. This intensity modulation is also inherent in beams 111 and 112 as they are split off from light 110. Returning beams 111 and 112 to photodetector via splitters 106 and 108, and fiber 122, carry the intensity modulation at frequency $f_k$. Electrical signal 126 is now explicitly given by $$V'_{126} = k_0(I_{00} + I_{01}\cos\omega_k t) \left\{ 1 + \cos \left[ \phi_R + \left( \frac{2\pi LD}{\lambda c} \right) k_1(1 - \right. \right. \quad (10a)$$

$$\left. \left. 2U)(I_{00} + I_{01}\cos\omega_k t) + \phi_f + \phi_m \cos(\omega_g t + \theta) \right] \right\}$$

Where $k_0$ is equal to the constant k divided by the source intensity which includes optical losses from the source to the detector and the transfer function of the detector 124.

Signal 132 carries the characteristic of beams 111 and 112 goes through demodulator 128, which demodulates signal with respect to the phase modulation of the beams performed by phase modulator 116 at frequency $f_m$ in loop 104. Signal 132 from demodulator 128 still has a modulation performed by intensity modulator 134 at frequency $f_k$ in source 102. Signal 132 is now given by $$V_{132} = k'_0 J_1(\phi_m)(I_{00} + I_{01}\cos 2\pi f_k t)\sin\left\{ \phi_R + \phi_f + \left(\frac{2\pi LD}{\lambda c}\right) k_1(1 - 2U)(I_{00} + I_{01}\cos 2\pi f_k t) \right\} \quad (10b)$$

Where $k'_0$ is a constant proportional to $k_0$ and the demodulator gain. Note that for the purposes of rotation sensing, the AC component of $V'_{132}$ at $f_k$ may be filtered out in the phase signal servo electronics so that the signal at $f_k$ does not affect the synthesis of the phase ramp or signal 133. In this case, $f_k$ may be chosen to facilitate or optimize this filtering process. Signal 132 may be rewritten as $$V'_{132} = -k'_0 I_{00} 2J_1(\phi_m) \sin(\phi_0 + \Delta\phi_e \cos\omega_k t) - 2k'_0 I_{01} J_1(\phi_m) \sin(\phi_0 + \Delta\phi_e \cos\omega_k t) \cos\omega_k t \quad (11)$$

where $$\phi_0 = \phi_R + \phi_f + \phi_{e0} \quad (12)$$

and $$\phi_{e0} = \beta(1 - 2U)I_{00} \quad (13)$$

and $$\beta = k_1\left(\frac{2\pi LD}{\lambda c}\right) \quad (13)$$

and $$\Delta\phi_e = \beta(1 - 2U)I_{01} \quad (14)$$

In equation 11, the DC component of the Kerr Effect error, represented by $\phi_{e0}$ is the error that the invention eliminates. The AC or modulated Kerr Effect error, represented in magnitude by $\Delta\phi_e$ is used to eliminate $\phi_{e0}$ as outlined below.

Equation 11 may be expanded into frequency components of $f_k$. The components of interest are the component at DC given by $V'_{132}(dc)$ and the component at $f_k$ given by $V'_{132}(f_k)$ as follows:

$$V'_{132}(dc) = -2k'_0 J_1(\phi_m)[I_{00} \sin\phi_0 J_0(\Delta\phi_e) + I_{01} \cos\phi_0 J_1(\Delta\phi_e)] \quad (15)$$

and $$V'_{132}(f_k) = -2J_1(\phi_m)k'_0 \cos\omega_k t[2I_{00}J_1(\Delta\phi_e)\cos\phi_0 + I_{01}\sin\phi_0(J_0(\Delta\phi_e) + J_2(\Delta\phi_e))[ \quad (16)$$

where $J_0$, $J_1$ and $J_2$ are Bessel functions.

$V'_{132}(dc)$ is critical for the generation of the phase ramp on signal 133 and determining rotation rate. Signal components of $V'_{132}$ at $nf_k$ where $n>2$ are of no interest and are filtered out. The signal component of $V'_{132}$ at $f_k$ given by $V'_{132}(f_k)$ is used to eliminate Kerr error as follows:

Signal 132 is demodulated with respect to a reference signal indicative of the intensity modulation of beams 111 and 112 at frequency $f_k$ from oscillator or modulator driver 138. Signal 142 from demodulator 140 is proportional to the strength of the bias due to Kerr effect in the sensing loop, i.e., proportional to the difference in optical intensities of waves 111 and 112. Signal 142 is given by $$V_{142} = -2J_1(\phi_m)k'_0 k_2[2I_{00}J_1(\Delta\phi_e)\cos\phi_0 + I_{01}\sin\phi_0(J_0(\Delta\phi_e) + J_2(\Delta\phi_e))] \quad (17)$$

where $k_2$ represents the gain of demodulator 140 and $\Delta\phi_e$ and $\phi_0$ contain information about the difference between optical wave intensities.

Source wavelength servo 144 receives signal 142 and its information indicating the difference, if any, between the intensities of beams 111 and 112. If there is a difference between the intensity levels, that is, the intensity levels are not equal, of beams 111 and 112, then source wavelength servo 144 outputs a signal 146 to source 102 so as to change the wavelength of light beam 110. This change of wavelength affects wavelength sensitive splitter 106 which changes the splitting ratio of splitter 106 thereby changing the intensity levels of beams 111 and 112. Feedback signal 142, indicating the difference between the intensity levels of beams 111 and 112, is such so as to affect the wavelength of light beam 110 from source 102, and in turn affect the splitting ratio of spltter 106 so as to cause the difference between the intensity levels of beams 111 and 112 to be minimized or decreased towards zero, thereby resulting in counterpropagating beams 111 and 112 having substantially equal intensity. This servo operation can be seen by noting that the phase ramp rotation servo causes $V'_{132}(DC)=0$ and the wavelength servo causes $V_{142}=0$. These two conditions can be rewritten from equations 15 and 17 to give, $$I_{00} \sin\phi_0 = -I_{01}\Delta\phi_e \cos\phi_0 \quad (18)$$

and $$\Delta\phi_e 2I_{00} \cos\phi_0 = -I_{01} \sin\phi_0 \quad (19)$$

where it has been assumed, that because $\Delta\phi_e \ll \pi$, that $J_0(\Delta\phi_e) \approx 1$, $J_1(\Delta\phi_e) \approx \Delta\phi_e$, $J_2(\Delta\phi_e) \approx 0$.

The simultaneous solutions for equations 18 and 19 are $$\phi_0 = 0 = \phi_R + \phi_f + \phi_{e0} = \phi_R + \phi_f + \beta(1-2U)I_{00} \quad (20)$$

and $$\Delta\phi_e = 0 = \beta(1-2U)I_{01} \quad (21)$$

From equation 21 it is obvious that the wavelength servo sets $U=0.5$ and therefore, in equation 20, $\phi_{e0}=0$ and $\phi_f=-\phi_R$. Thus, the DC component $\phi_{e0}$ of the Kerr effect and the modulated component are set to zero by making $U=0.5$. Therefore, beams 111 and 112 have equal intensities and face the same indices of refraction in their respective optical light paths, resulting in no optical Kerr effect.

Phase modulator 116 used for bias phase modulation of the counterpropagating beams may also be used for bringing in signal 133 to adjust the phase relationship of beams 111 and 112 to zero. Thus, signal 133 may be summed with the signal for bias phase modulation from oscillator or bias phase modulator driver 118, at summing amplifier 148.

It should be noted that the Kerr effect due to unequal light intensities in IOC modulator 116 located inside sensing loop 104, has been neglected in equations 1 through 21. This is a good approximation (and a helpful simplification) since the IOC modulator length typically constitutes less than $10^{-4}$ of the total loop length and would only very slightly change the exact magnitude of Kerr effect. Since the intent of the invention is to null the Kerr effect by setting the intensity of one wave equal to that of the other, the invention would still accomplish this result. In fact, in the case where there are unequal losses in the loop due to the integrated optics, the invention will null the total Kerr effect, thus adjusting the effective average intensities of the two waves in the clockwise and counter-clockwise directions. In this general case, U is interpreted as the effective power split ratio between beams 111 and 112. The servo loops act to null the total Kerr effect, thus effectively equalizing the two counterpropagating intensities.

I claim:

1. An interferometric fiber optic gyroscope comprising:

a light source;

a first splitter connected to said light source;

a wavelength sensitive optical power splitter connected to said first splitter;

a fiber optic sensing loop connected to said wavelength sensitive optical power splitter;

a detector connected to said first splitter;

a phase signal modulator connected to said fiber optic sensing loop;

a bias modulation frequency source connected to said phase signal modulator;

a phase signal modulation frequency source connected to said phase signal modulator;

a phase signal demodulator connected to said detector and to said bias modulation frequency source;

a light intensity modulator connected to said light source;

a light intensity modulation frequency source connected to said light intensity modulator;

a light intensity signal demodulator connected to said phase signal demodulator and to said light intensity modulation frequency source; and light source wavelength servo electronics connected to said light source.

2. The gyroscope of claim 1 wherein:

said wavelength sensitive optical power splitter, having an intensity splitting ratio, splits light from said light source into two light beams that counter-rotate in said fiber sensing loop, the light intensity splitting ratio being dependent on a wavelength of said light source, such that intensities of the two light beams approach equal magnitudes as the wavelength of said light source is adjusted;

the two light beams exit said fiber optic sensing loop and are combined in said wavelength sensitive optical power splitter, and propagate to said first splitter and to said detector;

said detector detects the two light beams and converts them via a photodetector into electrical beam signals;

the electrical beam signals are demodulated by said phase signal demodulator with respect to a first frequency of said bias modulation frequency source, and output signals from said phase signal demodulator indicate a phase relationship between the two light beams which in turn indicates a rotation rate of said fiber optic sensing loop;

the output signals from said phase signal demodulator are demodulated by said light intensity signal demodulator with respect to a second frequency of said light intensity modulation frequency source, and output signals from said light intensity signal demodulator indicate intensities of the two light beams; and the output signals from said light intensity signal demodulator are converted by said light source wavelength servo electronics into light source wavelength control signals which go to said light source to adjust the wavelength of said light source until the intensities of the two beams are equal.

3. The gyroscope of claim 1 further comprising phase signal electronics connected to said phase signal demodulator and to said phase signal modulator.

4. The gyroscope of claim 3 wherein:

said wavelength sensitive optical power splitter, having an intensity splitting ratio, splits light from said light source into two light beams that counter-rotate in said fiber sensing loop, the light intensity splitting ratio being dependent on a wavelength of said light source, such that intensities of the two light beams approach equal magnitudes as the wavelength of said light source is adjusted;

the two light beams exit said fiber optic sensing loop and are combined in said wavelength sensitive optical power splitter, and propagate to said first splitter and to said detector;

said detector detects the two light beams and converts them via a photodetector into electrical beam signals;

the electrical beam signals are demodulated by said phase signal demodulator with respect to a first frequency of said bias modulation frequency source, and output signals from said phase signal demodulator indicate a phase relationship between the two light beams;

the output signals from said phase signal demodulator are converted by said phase signal servo electronics into phase shifting signals having a magnitude which go to said phase signal modulator to adjust the phase relationship between the two light beams such that the phase relationship approaches a first value of phase difference between the two light beams, and the magnitude of the phase shifting signals indicates a rotation rate of said fiber optic sensing loop;

the output signals from said phase signal demodulator are demodulated by said light intensity signal demodulator with respect to a second frequency of said light intensity modulation frequency source, and output signals from said light intensity signal demodulator indicate intensities of the two light beams; and the output signals from said light intensity signal demodulator are converted by said light source wavelength servo electronics into light source wavelength control signals which go to said light source to adjust the wavelength of said light source until the intensities of the two beams are equal.

5. The gyroscope of claim 4 wherein the first value of phase difference between the two light beams is zero.

6. An interferometric fiber optic gyroscope comprising:

light source means for emitting a first light beam;

wavelength sensitive splitting means, connected to said light source means, for splitting the first light beam into second and third light beams, wherein said wavelength sensitive splitting means changes relative intensities between second and third beams in accordance with wavelengths of the first light beam;

sensing loop means, connected to said wavelength sensitive splitting means, for receiving second and third light beams which counterpropagate in said sensing loop means;

detection means, connected to said splitting means, for receiving and detecting the second and third light beams after they have traversed said sensing loop means, and for outputting electrical signals representing the second and third light beams;

phase modulation means, connected at one end of said sensing loop means, for phase modulating the third light beam upon entry into said sensing loop means and for phase modulating the second light beam upon exiting said sensing loop means;

first modulation driver means, connected to said phase modulation means, for driving said phase modulation means at a first frequency;

phase demodulation means, connected to said detection means and to said first modulation driver means, for demodulating the electrical signals from said detection means according to the first frequency, and outputting a signal indicative of a phase relationship between the second and third light beams, the phase difference between the second and third light beams being an indication of the rotation rate of said sensing loop means;

intensity modulation means, connected to said light source means, for intensity modulating the first light beam;

second modulation driver means, connected to said intensity modulation means, for driving said intensity modulation means in accordance with a second frequency;

intensity demodulation means, connected to said phase demodulation means and to said second modulation driver means, for demodulating electrical signals representing the second and third light beams, and outputting signals indicative of an intensity difference between the second and third light beams;

source wavelength servo electronics means, connected to said intensity demodulation means and to said light source means, for adjusting a wavelength of said light source means in accordance with signals from said intensity demodulation means, indicative of the intensity difference between second and third light beams, and a change of the wavelength of the first light beam going from said light source means into wavelength sensitive splitting means is such that the wavelength is adjusted to change the relative intensities between second and third light beams so that the intensities of the second and third light beams are made equal.

7. An interferometric fiber optic gyroscope comprising:

light source means for emitting a first light beam;

wavelength sensitive splitting means, proximate to said light source means, for splitting the first light beam into second and third light beams, wherein said wavelength sensitive splitting means changes relative intensities between second and third beams in accordance with wavelengths of the first light beam;

sensing loop means, connected to said wavelength sensitive splitting means, for receiving second and third light beams which counterpropagate in said sensing loop means;

detection means, connected to said splitting means, for receiving and detecting the second and third light beams after they have traversed said sensing loop means, and for outputting electrical signals representing the second and third light beams;

phase modulation means, connected at one end of said sensing loop means, for phase modulating the third light beam upon entry into said sensing loop means and for phase modulating the second light beam upon exiting said sensing loop means;

first modulation driver means, connected to said phase modulation means, for driving said phase modulation means at a first frequency;

phase demodulation means, connected to said detection means and to said first modulation driver means, for demodulating the electrical signals from said detection means according to the first frequency, and outputting a signal indicative of a phase relationship between the second and third light beams;

phase servo electronic means, connected to said phase demodulation means and to said phase modulation means, for receiving the signal indicative of the phase relationship between the second and third light beams and outputting phase modulation signals to said phase modulator means, wherein the phase modulation signals have a sufficient magnitude to modulate the second light beam so as to bring the second light beam in phase with the third light beam, the amount of magnitude of the phase modulation signals being an indication of a rotation rate of said sensing loop means;

intensity modulation means, connected to said light source means, for intensity modulating the first light beam;

second modulation driver means, connected to said intensity modulation means, for driving said intensity modulation means in accordance with a second frequency;

intensity demodulation means, connected to said phase demodulation means and to said second modulation driver means, for demodulating electrical signals representing the second and third light beams, and outputting signals indicative of an intensity difference between the second and third light beams;

source wavelength servo electronics means, connected to said intensity demodulation means and to said light source means, for adjusting a wavelength of said light source means in accordance with signals from said intensity demodulation means, indicative of the intensity difference between second and third light beams, and a change of the wavelength of the first light beam going from said light source means into wavelength sensitive splitting means is such that the wavelength is adjusted to change the relative intensities between second and third light beams so that the intensities of the second and third light beams are made equal.

8. A Kerr effect reducer for an interferometric fiber optic gyroscope having:

a light source for emitting a first light beam;

a splitter, connected to said light source, for splitting the first light beam into second and third light beams;

a sensing loop, connected to said splitter, for receiving second and third light beams which counterpropagate in said sensing loop;

a detector, connected to said splitter, for receiving and detecting the second and third light beams after they have traversed said sensing loop, and for outputting electrical signals representing the second and third light beams;

a phase modulator, connected at one end of said sensing loop, for phase modulating the third light beam upon entry into said sensing loop and for phase modulating the second light beam upon exiting said sensing loop;

a first modulation driver, connected to said phase modulator, for driving said phase modulator at a first frequency;

a phase demodulator, connected to said detector and to said first modulation driver, for demodulating the electrical signals from said detector according to the first frequency, and outputting a signal indicative of a phase relationship between the second and third light beams, the phase difference between the second and third light beams being an indication of the rotation rate of said sensing loop; and said Kerr effect reducer comprising:

an intensity modulator, connected to said light source, for intensity modulating the first light beam;

a second modulation driver, connected to said intensity modulator, for driving said intensity modulator in accordance with a second frequency;

an intensity demodulator, connected to said phase demodulator and to said second modulation driver, for demodulating electrical signals representing the second and third light beams, and outputting signals indicative of an intensity difference between the second and third light beams; and source wavelength servo electronics, connected to said intensity demodulator and to said light source, for adjusting a wavelength of said light source in accordance with signals from said intensity demodulator, indicative of the intensity difference between second and third light beams, and the first light beam having an adjusted wavelength goes from said light source into said splitter, wherein said splitter is a wavelength sensitive splitter in that said wavelength sensitive splitter changes relative intensities between the second and third beams in accordance with the adjusted wavelength of the first light beam, and the wavelength is adjusted to change the relative intensities between second and third light beams so that the intensities of the second and third light beams approach equal magnitudes, thereby reducing Kerr effects.

9. A Kerr effect reducer for an interferometric fiber optic gyroscope having:

a light source for emitting a first light beam;

a splitter, proximate to said light source, for splitting the first light beam into second and third light beams;

a sensing loop, connected to said splitter, for receiving the second and third light beams which counterpropagate in said sensing loop;

a detector, connected to said splitter, for receiving and detecting the second and third light beams after they have traversed said sensing loop, and for outputting electrical signals representing the second and third light beams;

a phase modulator, connected at one end of said sensing loop, for phase modulating the third light beam upon entry into said sensing loop and for phase modulating the second light beam upon exiting said sensing loop;

a first modulation driver, connected to said phase modulator, for driving said phase modulator at a first frequency;

a phase demodulator, connected to said detector and to said first modulation driver, for demodulating the electrical signals from said detector according to the first frequency, and outputting a signal indicative of a phase relationship between the second and third light beams;

phase servo electronics, connected to said phase demodulator and to said phase modulator, for receiving the signal indicative of the phase relationship between the second and third light beams and outputting phase modulation signals to said phase modulator, wherein the phase modulation signals have a sufficient magnitude to modulate the second light beam so as to bring the second light beam in phase with the third light beam, the amount of magnitude of the phase modulation signals being an indication of a rotation rate of said sensing loop; and said Kerr effect reducer comprising:

an intensity modulator, connected to said light source, for intensity modulating the first light beam;

a second modulation driver, connected to said intensity modulator, for driving said intensity modulator in accordance with a second frequency;

an intensity demodulator, connected to said phase demodulator and to said second modulation driver, for demodulating electrical signals representing the second and third light beams, and outputting signals indicative of an intensity difference between the second and third light beams; and source wavelength servo electronics, connected to said intensity demodulator and to said light source, for adjusting a wavelength of said light source in accordance with signals from said intensity demodulator, indicative of the intensity difference between second and third light beams, and the first light beam having an adjusted wavelength goes from said light source into said splitter, wherein said splitter is a wavelength sensitive splitter in that said wavelength sensitive splitter changes relative intensities between the second and third beams in accordance with the adjusted wavelength of the first light beam, and the wavelength is adjusted to change the relative intensities between second and third light beams so that the intensities of the second and third light beams approach equal magnitudes, thereby reducing Kerr effects.

\* \* \* \* \*